United States Patent [19]

Dearlove et al.

[11] 4,383,060

[45] May 10, 1983

[54] EPOXY ADHESIVE FOR STRUCTURALLY BONDING MOLDED SMC

[75] Inventors: Thomas J. Dearlove, Troy; Richard K. Gray, Warren, both of Mich.

[73] Assignee: General Motors Corporation, Detroit, Mich.

[21] Appl. No.: 383,469

[22] Filed: Jun. 1, 1982

[51] Int. Cl.³ .............................................. C08L 63/04
[52] U.S. Cl. .................................... 523/429; 523/443; 523/466; 524/919
[58] Field of Search ....................... 523/429, 443, 466; 524/919

[56] References Cited

U.S. PATENT DOCUMENTS 4,187,348  2/1980  Dearlove et al. ................... 428/418
4,273,686  6/1981  Noland et al. ...................... 524/919

*Primary Examiner*—Lewis T. Jacobs
*Attorney, Agent, or Firm*—Elizabeth F. Harasek

[57] ABSTRACT

A novel adhesive has been developed that is particularly adapted for use in bonding automotive components made of sheet molding compound. It is comprised of suitable amounts of cross-linkable epoxy novolac resin; an epoxy flexibilizer; natural and colloidal silica; and an imidazole curing agent substituted in the one position with a short chain hydroxyalkyl group. The adhesive cures to a high bond strength in three minutes at 150° C. It is resistant to degradation due to temperatures up to 200° C., salt spray, humidity and water soak.

3 Claims, 5 Drawing Figures

EPOXY ADHESIVE FOR STRUCTURALLY BONDING MOLDED SMC

BACKGROUND

This invention relates to thermoset epoxy compositions for adhesively bonding molded panels of sheet molding compund to one another. The invention relates particularly to adhesives for molded SMC that cure rapidly and retain their adhesive strength at elevted temperatures.

In an effort to reduce the weight and corrosion susceptibility of automotive body panels, there has been a move towards making them from sheet molding compound (SMC). SMC is a moldable composite material generally made up of an unsaturated liquid polyester resin, a low profile thermoplastic resin, an inert filler, magnesium oxide or other maturation aids, and shaped or milled glass fiber reinforcement. The constituents are generally mixed between two protective films of polyethylene or other such material. The SMC sandwich is then allowed to age until the polyester resin matures to a putty-like consistency. Preliminary to molding, the protective sheets are removed and the matured SMC is cut into pieces of appropriate size for a particular mold. Parts are formed from SMC by laying these pieces at suitable locations in a compression mold. The mold is closed and the resinous material flows under the applied heat and pressure. Heating initiates final cross-linking of the polyester resin and the incumbent formation of a self-supporting fiber reinforced SMC part.

SMC has been used in the automotive industry for some time. For example, the Corvette model manufactured by the Chevrolet Division of General Motors has molded SMC body panels. It is often preferable to adhesively bond such panels to each other or to underlying support members rather than mechanically attaching them. However, when SMC panels are used in conjunction with metal panels on the same vehicle body and painted at the same time, it is necessary for the adhesive to tolerate the same conditions as the metal in the finishing process. Some automotive finishes for metals require paint oven temperatures in the range of 180° C. While this presents no problem to SMC panels themselves, prolonged heating in paint ovens generally causes ffailure or substantial degradation of known adhesives for SMC. The most commonly used SMC adhesives today are two part polyurethane materials. Although these adhesives cure rapidly, at elevated temperatures their bond strength is substantially diminished. In fact, all of the commercial adhesives that we tested failed at 190° C. or less. Most experienced catastrophic losses in bond strength even at temperatures around 160° C.: that is, the adhesion bonds failed in the ovens before the paint cured.

Another production consideration is the time required for the adhesive to cure. These times should be short (about three minutes or less) to be compatible with assembly line operations. The bond strength after this initial cure must be great enough to support the weight of a panel without special fixturing. While urethanes meet this criteria, as noted above, they cannot take high temperatures.

Objects

It is therefore an object of the invention to provide a novel adhesive for molded SMC that cures rapidly at reasonable temperatures, develops high bond strength after a short cure time, and which will not weaken substantially upon extended exposure to temperatures up to about 200° C. A more particular object is to provide a thermoset epoxy adhesive that is suitable for use in bonding automotive sheet molding compound panels to each other or to underlying support members. A more particular object is to provide an epoxy adhesive that will stand up to the elevated temperatures encountered in paint ovens. Another particular object of the invention is to provide a rapidly curable, thermoset epoxy adhesive that can be applied directly to an SMC panel without untoward surface pretreatment under assembly line conditions. A further object is to provide an adhesive for molded SMC that can withstand extended exposure to humidity, salt spray and more without appreciable loss of adhesive properties and whose adhesive properties are substantially retained at temperatures as low as minus 80° C. and as high as plus 200° C.

Brief Summary

In accordance with the preferred practice of our invention, these and other objects may be accomplished by formulating an epoxy based adhesive as follows. The amount of each constituent is in parts by weight unless otherwise stated.

The principal constituent of the subject adhesives for SMC-SMC bonding is a glycidal ether phenol formaldehyde novolac resin. The resin preferably has an epoxide functionality greater than two, but in no case should the functionality be so low that the polymer does not cross-link when cured.

For each 100 parts novolac resin, about 10 to 20 parts of an adduct of a diglycidyl ether of bisphenol A and a hydrogenated vegetable oil are added. This adduct provides some flexibility to the novolac resin. About 125 parts natural silica are also dispersed in the epoxies. The silica increases the viscosity of the composition and serves to prevent degradation of adhesive bond strength at both elevated and reduced temperatures. The incorporation of a small amount of thixotropic colloidal silica was found to markedly improve the handling properties of the uncured composition. Without the colloidal silica, the material was stringy. Its presence also enhanced the dispersion of the natural silica in the uncured epoxy resin.

The subject adhesive was developed specifically for use on an assembly line. Thus, one critical requirement is rapid curability brought about by a suitable catalyst. Ideally, the adhesive would achieve a bond strength adequate to support an automotive SMC body panel attached to an SMC support member with an adhesive bead in about three minutes. However, the epoxy catalyst used to speed the cure must not be so active that the adhesive has no room temperature stability. In accordance with this invention, the catalyst is a liquid imidazole substituted in the two position with an alkyl group. The preferred catalyst is 1-(2-hydroxy propyl)-2-methylimidazole which is incorporated in an amount of about 0.8 moles per 1000 grams epoxy novolac resin.

In production, the adhesive would preferably be made in two parts, one containing the epoxies, and the other the catalyst. The parts would be metered and mixed together immediately before use. The composition after mixing is viscous enough to form a discrete bead when extruded onto a surface and can be worked at room temperature for a period of at least several hours. However, when heated at 150° C. for three minutes it forms a very tight adhesive bond, more than adequate to meet automotive assembly needs. Where this adhesive provides a substantial improvement over all other adhesives in the automotive application is its ability to maintain a good adhesive bond at elevated temperatures up to about 200° C. We are not aware of any commercially available adhesive that performs as well at such elevated temperatures.

Our invention is a particular combination of an epoxy novolac resin, an epoxy based flexibilizer, silica filler, colloidal silica, and a suitable catalyst. If these particular constituents are not combined in the amounts claimed herein, the resultant adhesive does not meet the criteria necessary for bonding sheet molding compound in the automotive industry. The subject compositions cure to a high bond strength by the simple application of heat in only three minutes. After such minimal cure time, even relatively large panels of sheet molding compound attached to an SMC substrate and vertically oriented with respect to it will not shift when fixturing is removed. The cured adhesive is resistant to significant degradation due to heat exposure, thermal cycling, salt spray, moisture and more.

DETAILED DESCRIPTION

Our invention will be more clearly understood in view of the detailed description which follows:

In the drawings,

FIG. 1 shows the effect of catalyst level on cure time of the subject epoxy novolac resin for several different imidazole catalysts at levels between 0.02 and 0.09 moles per 100 grams epoxy.

Figure 1:
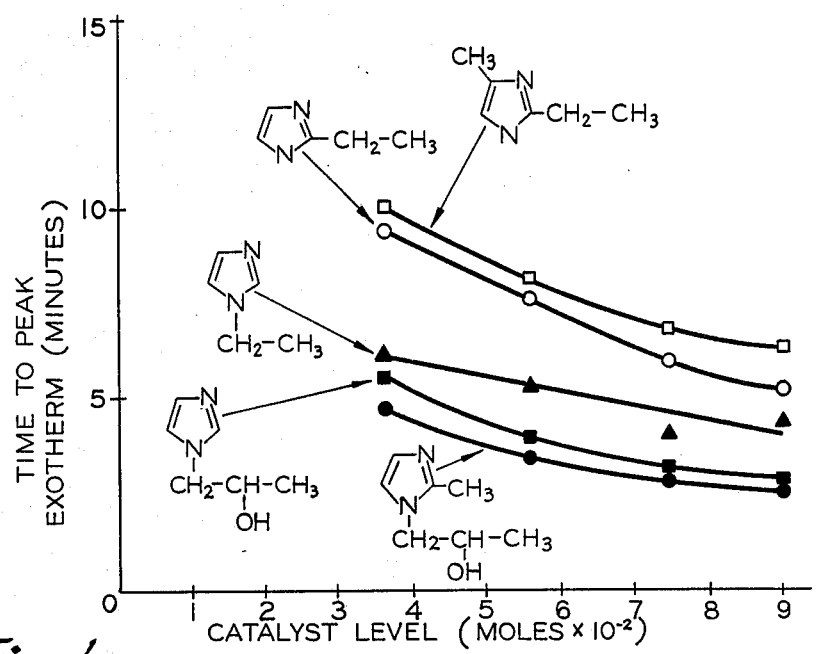

Referring to Table I, our initial work was done with linear epoxies based on epichlorohydrin and bisphenol A. One such epoxy is DER 330 sold by Dow Chemical Co. LP-3 is a liquid mercaptan terminated polysulfide elastomeric prepolymer having a number average molecular weight of about 1000, marketed by Thiokol Chemical. Emtal 599 is a platey talc filler marketed by Eastern Magnesia. Aluminum 123 is aluminum powder sold by Alcoa Aluminum, and AP-5 is 1-(2-hydroxy propyl) 2-methylimidazole (HPMI) epoxy catalyst sold by Archem. Premix Corporation's SMC 7209-30 is a conventional low profile sheet molding compound formulation used in automotive production. However, as seen at Table I, none of the formulations gave the desired initial bond strength of at least about 6000 Joules per square meter (J/m²) required for automotive bonding applications. The highest initial bond strength as measured by torsional impact testing on a Tinius-Olsen impact tester according to ASTM D-950-72 was about 5,400 J/m². This was after a cure of 4 minutes at 150° C. with impact testing 60 seconds thereafter. This cure duration was a full minute longer than the desired 3 minute limit tolerable on automotive assembly lines.

TABLE I

Composition and Properties of SMC Adhesives Based on DER 330 Epoxy Resin

| | Formulation No. | | | | |
|---|---|---|---|---|---|
| Component | 1 | 2 | 3 | 4 | CA50 |
| A. Composition (parts by weight) | | | | | |
| DER 330 | 100 | 100 | 100 | 100 | 100 |
| LP-3 | 20 | — | 20 | 40 | 20 |
| EMTAL 599 | — | — | — | — | 60 |
| Aluminum 123 | — | — | — | — | 180 |
| AP-5 | 6 | 13 | 13 | 13 | 13 |
| B. Properties | | | | | |
| Torsional Impact Strength $(J/m^2)^{a,b}$ | | | | | |
| Initial[c] | 2800 | 5100 | 2900 | 3200 | 5400 |
| Room Temperature | 4500 | 6300 | 5800 | 5250 | 5800 |
| After paint cycle[d] | * | * | * | * | 9300 |

[a]Premix SMC 7209-30 cleaned with a trichloroethane wipe
[b]No. 1 cured 4 minutes at 150° C.
[c]Tested 60 seconds after cure
[d]Two cycles of 30 minutes each at 182° C. and tested at room temperature
*Bond failed during 182° C. cycle Seeking higher initial bond strengths, we looked into crosslinkable epoxy novolac resins having the basic structure:

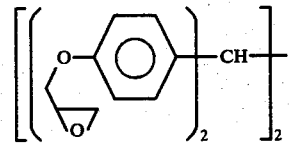

Such epoxy resins belong to a family characterized as polynuclear phenol glycidyl ether-derived resins. A preferred resin is D.E.N. 431, sold by Dow Chemical. A comparable resin is E.P.N. 1139 sold by Ciba Geigy. D.E.N. 431 has characteristics as set out below.

| D.E.N. 431 - Epoxy Phenol Novolac | |
|---|---|
| n value | 0.2 |
| epoxide equiv. wt. | 175 |
| epoxy functionality | 2.2 |
| viscosity, centipoise at 52° C. | 1,400 |
| softening point, Durran | 1 |
| heat distortion, °C.[a] | 156(165) |

[a]Cured with methylenedianiline:gelled 16 h at 55° C. + 2 h at 125° C. + 2 h at 175° C. No. in parenthesis additional 4 h at 200° C.)

These epoxy resins are crosslinkable at the epoxy groups forming thermally stable cured adhesives. They are prepared from phenol-formaldehyde condensation products and preferably have an epoxide equivalent weight in the range of from about 150 to 200 and a viscosity at about 50° C. in the range of from about 1,000 to 2,000 centipoise.

FIG. 1 shows the effect of five different catalytic curing agents on DER 330 epoxy resin. The results can be directly correlated with faster curing epoxy novolac resins. Measurements were made by differential scanning calorimetry, the peak exotherm being indicative of the required time to cure. To be useful in automotive applications an initial high bond strength of at least about 6,000 J/m² is necessary after a cure period of about 3 minutes or less at about 150° C. Only the 1-(2-hydroxy propyl)imidazole (HPMI) and 1-(2-hydroxy propyl)-2-methyl imidazole provided fast enough cures. In accordance with the invention, these curing agents should be incorporated in amounts of about 0.07 to 0.10 moles per hundred grams epoxy novolac. Lesser amounts do not provide rapid enough cures, while greater amounts do no provide any additional benefit.

On the basis of our tests, we believe that imidazole curing agents substituted in the one position (on the nitrogen) with a short chain hydroxyl alkyl group to be suitable curing agents for the subject invention. Any such imidazole that will achieve a bond strength of at least about 6,000 Joules per square meter (ASTMD-950-72) after heating for 3 minutes at 150° C. may be used. Imidazoles other than the one-hydroxy alkyl do not provide rapid enough cure. For example, 2-ethyl-4-methylimidazole, 2-ethylimidazole, and 1-ethylimidazole do not achieve the desired bond strengths within 3 minutes at 150° C.

The third constituent having significant effect on the performance of the subject adhesives is silica filler. Preferred silica fillers are natural amorphous silica powders having average particle sizes in the range of from about 2 to 100 microns. The silica increases the viscosity of the epoxy resins and curing agents so that they can be applied by skiving onto the surface of an SMC part to be bonded or by extending a bead and pressing the SMC parts together. Once the epoxy is cured, the silica provides reinforcement to the adhesive improving its long-term adhesive qualities and stabilizing it to some extent over a wide temperature range. The silica powder was dried for a minimum of sixteen hours at 150° C. prior to its use.

A small amount, preferably about 2 to 8 parts, thixotropic collodial silica should also be added to improve the handling properties of the adhesive. We found that incorporating small amounts of colloidal silica eliminates the tendency for the uncured adhesive to be stringy when skived onto a surface.

Earlier work, described in U.S. Pat. No. 4,187,348 assigned to the assignee hereof, discloses the use of polysulfide rubber as a flexibilizer for thermoset imidazole cured linear epoxy resins. However, we found that the use of polysulfide rubber in novolac epoxy based compositions, substantially weakened adhesive bond properties, both initially and after exposure to high temperatures.

We discovered that the preferred flexibilizers for the subject epoxy adhesive compositions are epoxidized vegetable oils or epoxidized alkyl esters of oleic or tall oil fatty acids. Vegetable oils include, for example, linseed oil, safflower oil, soybean oil, corn oil, cottonseed oil, rape seed oil, and peanut oil. The oxygen content and weight percent of these epoxidized vegetable oils generally ranges from about 5 to 12 percent. A preferred flexibilizer is Reichhold Chemicals' Epotuf 37-151. It is an adduct of 2.5 moles of a diglycidyl ether of bisphenol-A and one mole of hydrogenated castor oil. Epoxidized vegetable oils or alkyl esters are preferably incorporated in amounts of from about 10 to 20 parts per 100 parts epoxy novolac. All suitable flexibilizers have functional epoxy groups that are reacted into the cured adhesive.

Table II lists preferred constituents for the subject invention, their chemical formulation or morphological properties, and a commercial source of each.

TABLE II

| Tradename | Supplier | Description or Remark |
|---|---|---|
| DER 330 | Dow Chemical Co. | Bisphenol A-epichlorohydrin based epoxy resin |
| DEN 431 | Dow Chemical Co. | Phenol formaldehyde based epoxy resin |
| LP-3 | Thiokol Chemical Co. | Mercaptan terminated difunctional flexibilizer |
| Epotuf 37-151 | Reichhold Chemical Co. | Flexible epoxy resin |
| EMTAL 599 | A. E. Fleming Co. | Talc, average particle size = 2.7 $\mu$ |
| Aluminum 123 | Alcoa | Average particle size = 18 $\mu$ |
| Silica 219 | Whittaker, Clark and Daniels, Inc. | Crystalline silica, average particle size = 1.1 $\mu$ |
| Silica A108 | Whittaker, Clark and Daniels, Inc. | Amorphous silica, average particle size > 5 $\mu$ |
| Monarch 900 | Cabot Corp. | Carbon black, average particle size = 0.015 $\mu$ |
| TiO$_2$ 328 | Whittaker, Clark and Daniels, Inc. | Titanium dioxide, oil dispersible |
| Aerosil 308 | Baker and Collinson, Inc. | Fumed silica |
| Ap-5 | Archem Corp. | 1-(2-hydroxy propyl)imidazole curing agent |

Figure 4:
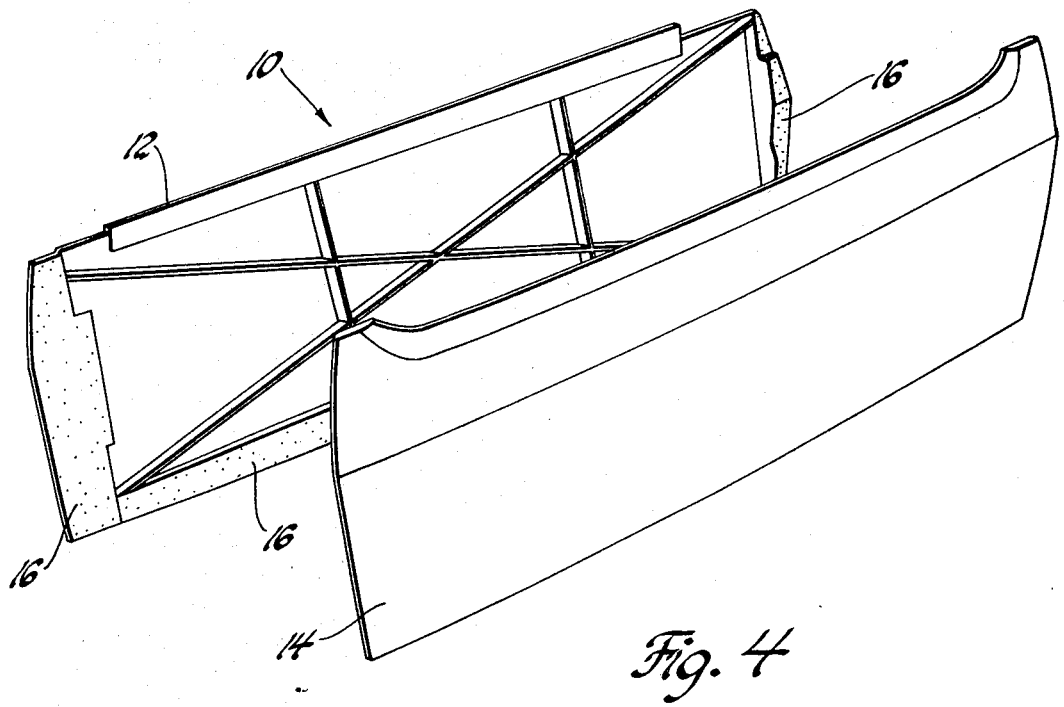
FIG. 4 is a perspective exploded view of a two piece compression molded SMC tailgate for an automotive station wagon, the two pieces being permanently joined with the subject adhesive.

Referring to FIG. 4, the SMC used in the examples was obtained in bulk, uncured form from a General Motors manufacturing facility where SMC tailgates 10 for station wagons are being constructed. Two SMC materials were, at that time, being used. A "low profile" one for the inner door panel 12 (Premix Corporation, 7209-30) and a "standard" one for the outer door panel 14 (Budd Company, 993). In addition to weight savings, use of SMC for making such tailgates reduces the number of pieces necessary for the finished subassembly. To complete the subassembly, inner panel 12 is simply bonded to outer panel 14 with a layer 16 of the subject adhesive.

Test panels for the examples were molded from the bulk SMC into 2.5–3.0 mm thick plaques using a cure time of 120 seconds, cure temperature of 145°–150° C. and a molding pressure of 6900 kPa. No differences were observed between the bonding characteristics of the Premix and Budd SMC formulations.

The various experimental formulations were first prepared by hand mixing in small glass bottles. When a more detailed evaluation of an adhesive formulation was undertaken, it was prepared in two parts using an Atlantic Research Helicone mixer. With this equipment, the material could be degassed during the mixing step which reduced the level of air bubbles in the cured adhesive. A black pigment, carbon black, was incorporated in one component, and a white pigment, titanium oxide, on the other. The mixture of components was therefore grey in color.

When two part formulations were mixed, a glass plate and flexible spatula were used to give a product of uniform color. The epoxy containing Part A (white) and catalyst containing Part B (black) were weighed onto the glass plate (12.75 g Part A to 1.0 g Part B) and the two materials were mixed with the spatula by continually spreading the adhesive out into a thin layer. This technique not only mixed the two parts, but it also tended to eliminate air bubbles that were mechanically trapped in the adhesive.

Figure 5:
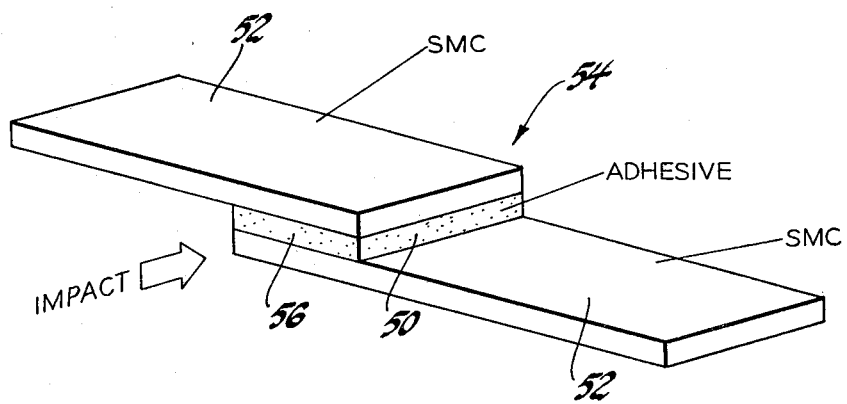
FIG. 5 is a representation of SMC sample coupons used to test the impact strength of the subject epoxy adhesive.

SMC samples were prepared for adhesion testing as follows. The SMC coupons were prepared for bonding by solvent wiping with acetone to remove dirt, grease or excess zinc stearate release agent. Referring to FIG. 5, mixed adhesive 50 was placed on SMC coupons 52 to give a 323 mm² bonded area with a bond line thickness of 0.7 mm. The fixture in which the test coupons were bonded was preheated to 150° C. on a hot plate before the SMC coupons, with adhesive already applied, were set in place on the fixture. With this arrangement, the test specimens were heated from both sides during the curing operation.

A torsional impact test was routinely used to evaluate the experimental adhesive formulations. A Tinius-Olsen Izod impact tester was modified to hold the bonded SMC coupon assembly 54 and impact it in the center 56 of the bonded area as shown in FIG. 5. Normally, any adhesive that gave an impact strength in excess of 6,000 J/m² caused the SMC coupons to fail before the adhesive bond let loose. This condition was basically the criterion used by General Motors to evaluate the performance of SMC adhesives. The impact specimens were tested under various conditions. More specifically, this test method was used to evaluate the initial hot strength of the adhesive right after cure, as well as the strength after thermal cycling, at low temperature and after environmental exposure.

EXAMPLE 1

Table III sets forth the composition of a preferred SMC adhesive in accordance with the subject invention. It also lists physical properties, torsional impact and environmental test results for the adhesive cured 3 minutes at an ambient temperature of 150° C.

TABLE III

| Composition and Properties of SMC Adhesive | | |
|---|---|---|
| Components | Part A | Part B |
| A. Composition (parts by weight) | | |
| DEN 431 | 100 | — |
| Epotuf 37-151 | 15 | — |
| Silica A108 | 115.8 | 9.2 |
| Aerosil 308 | 5 | 0.1 |
| TiO₂ | 3.6 | — |
| Carbon black | — | 0.1 |
| AP-5 | — | 9.0 |
| Density (g/cc) | 1.67 | 1.57 |
| Viscosity (mPa.s)ᵃ | 1,500,000 | 230,000 |
| Mix ratio (by volume) | 12:1 (Part A to Part B) | |
| B. Properties | | |
| Torsional Impact Strength (J/m²)ᵇ | | |
| Initial tests | | |
| hot | 7,300 | |
| room temperature | 8,200 | |
| −78° C. | 6,550 | |
| Environmental tests (8 weeks) | | |
| control | 6,500 | |
| salt spray | 6,000 | |
| humidity | 7,000 | |
| water soak | 6,100 | |

ᵃBrookfield spindle #6 at 25° C.
ᵇAcetone wipe of SMC, cured 3 minutes at 150° C.

In a typical laboratory preparation, a mixture containing 1000 grams epoxy novolac resin (DEN 431) and epoxidized oil (Epotuf 37-151) were mixed and preheated to about 100° C. This mixture was placed in a helical blade mixer with water jacketed walls maintained at a temperature of about 45° to 50° C. The resin was stirred and degassed in the mixer for about an hour under a vacuum of about 0.11 mm of mercury. Thereafter, 1.158 kg silica and 50 grams silica gel were added and the mixture was stirred for an additional half hour. Thereafter, about 36 grams titanium oxide, a white pigment, were added. The mixture was again stirred. This comprised Part A of the two part epoxy system. Its density at room temperature was about 1.67 grams per cubic centimeter and its Brookfield spindle No. 6 viscosity at 25° C. was 1.5×10⁶ mpa·s.

Part B, the curative, was made by mixing about 92 grams silica, 1 gram thixotropic silica gel, 1 gram carbon black (a black pigment) and 90 grams 1-(2-hydroxy propyl)-2-methylimidazole curing agent (AP-5) at room temperature in a high sheer mixer.

Figure 2:
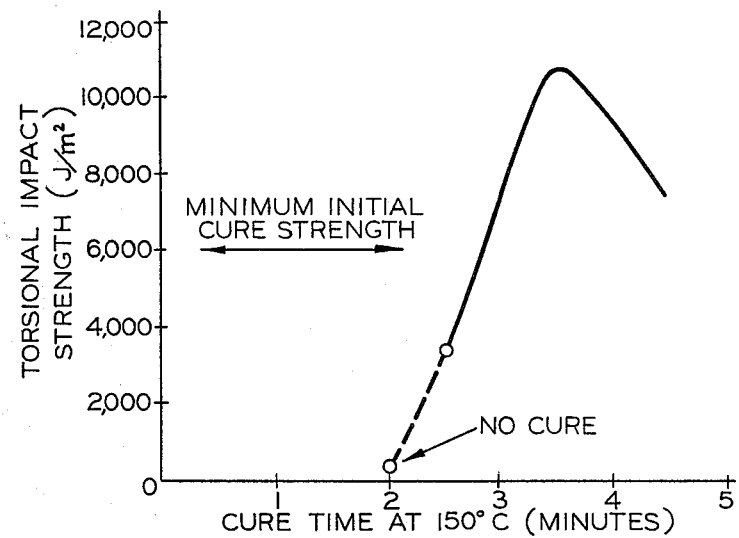
FIG. 2 is a plot of cure time at 150° C. in minutes versus the initial torsional impact strength of an SMC to SMC bond.
Figure 3:
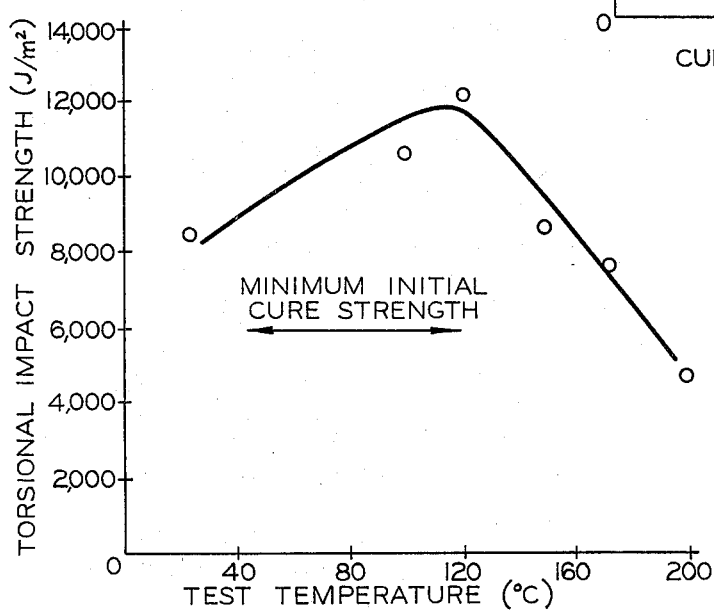
FIG. 3 is a plot of torsional impact strength as a function of test temperature for samples cured at 150° C. for three minutes and equilibrated for 1 hour at the test temperature.

To form the skivable adhesive, Part A was mixed in a 12:1 volume ratio with Part B. This provided suitable amounts of imidazole curing agent to crosslink and cure the epoxy resins. The adhesive was cured for 3 minutes in a fixture in an oven preheated to 150° C. The torsional impact properties of some of the samples were determined within one minute of cure, others at about 25° C. (room temperature), and others at dry ice temperatures −78° C. FIG. 3 is a plot of torsional impact strength for the adhesive of this example as a function of test temperature. It can be seen that the composition has a minimum impact strength at a temperature of about 120° C. and lesser impact strengths at both lower and higher temperatures. At temperatures approaching about 200° C., the torsional impact strengths begin to fall below the desired 6000 Joules per meter squared level. Studies were also done on the torsional impact strength as a function of the cure time at a temperature of 150° C. These results are shown in FIG. 2. Clearly, the cure time of slightly over 3 minutes is preferred. These torsional impact strengths were all taken within 30 seconds after removal from the cure fixture. A cure of 3 minutes at 150° C. provides greater than the 6000 Joules per square meter demanded for SMC automotive body panel applications.

Torsional impact tests were also conducted on samples aged for 8 weeks under the following conditions. The control sample was simply maintained in the laboratory for 8 weeks. The salt spray corrosion cycle involves placement of the panel in a 5% sodium chloride salt spray solution at 37.8° C. for eight weeks. The humidity test involved placing the sample in a humidity chamber at 100% relative humidity at 37.8° C. for the same period, and the water soak immersing the sample in water for the 8 week period.

As seen in Table III, the cycle most destructive to the adhesive qualities was the salt spray. However, even this did not reduce the bond strength below 6000 Joules per square meter, a relatively high and acceptable adhesive strength.

EXAMPLE 2

Referring to Table IV, several other adhesive compositions were prepared as one-part systems, the catalyst being added last. All of the compositions containing the silica filler achieved the desired initial bond strength of at least 6000 Joules per square meter. The handling properties of the adhesives were substantially improved by the addition of the flexible epoxy (Epotuf 37-151), the silica (Silica A108) and the colloidal thixotrope (Aerosil 308). All samples were cured at 150° C. for 3 minutes and tested 30 seconds after completion of the cure. Surprisingly, formulation 3 tested at −78° C. gave an exceptional average shear impact strength of 9,500 Joules per square meter. We have found that the subject adhesive compositions maintain a torsional impact strength of greater than 6000 Joules per square meter at temperatures in the range of −78° C. to almost 200° C.

In conclusion, we have developed a novel epoxy based composition for bonding sheet molding compound panels that achieves excellent results over wide temperature ranges. The adhesive is the only one meeting the cure time and temperature requirements of practical automotive assembly practices. It is the only one that maintains its integrity under adverse environmental conditions such as salt spray, high humidity and water soaking. While the subject adhesives according to the invention must contain the ingredients specified in the claims, those skilled in the art may add small amounts of other ingredients without interfering with the practice of the invention.

TABLE IV

Composition and Properties of SMC Adhesives Based on DEN 431 Epoxy Novolac

| Component | Formulation No. (parts by weight) | | | |
|---|---|---|---|---|
| | 1 | 2 | 3[a] | 4 |
| DEN 431 | 100 | 100 | 100 | 100 |
| Epotuf 37-151 | — | — | 15 | 15 |
| Silica 219 | — | 125 | 125 | — |
| Silica A108 | — | — | — | 125 |
| Carbon black | — | — | — | 2.5 |
| TiO$_2$ | — | — | — | — |
| Aerosil 308 | — | — | — | 5.0 |
| AP-5 | 8.8 | 8.8 | 9.0 | 9.0 |
| Surface Preparation[b] | B | B | B | C |
| Torsional Impact Strength[c] (J/m$^2$) | 5950 | 7350 | 7700 | 7350 |

[a]Formulation No. 3, tested at −78° C., gave an average shear impact strength = 9500 J/m$^2$
[b]Surface preparation of SMC
A = trichloroethane wipe
B = light sanding of surface
C = acetone wipe
[c]Samples cured 3 minutes at 150° C. and tested 30 seconds after completion of the cure Thus, while our invention has been described in terms of specific embodiments thereof, it will be appreciated. that other forms may be readily adapted by one skilled in the art. Accordingly, the scope of the invention is to be considered limited only by the following claims.

The embodiments of the invention in which an exclusive property or privilege is claimed are defined as follows:

1. A heat curable viscous adhesive composition for bonding molded articles of sheet molding compound to each other, said adhesive being resistant to degradation by environmental exposure and comprising in parts by weight
100 parts cross-linkable epoxy novolac resin having an epoxide equivalent weight in the range of from about 150 to 200 and a viscosity at 50° C. in the range of from about 1,000 to 2,000 centipoise;
from about 10 to 20 parts of an epoxy flexibilizer consisting essentially of an adduct of diglycidyl ether of bisphenol-A and an alkyl ester of a fatty acid;
from about 100 to 150 parts natural silica having an average particle size in the range of from about 2 to 100 microns;
from about 2 to 8 parts thixotropic colloidal silica; and
an amount of imidazole curing agent substituted in the 1-position with a hydroxyalkyl group sufficient to achieve a bond strength between molded articles of sheet molding compound bonded to each other with an interlayer of said adhesive composition of at least 6,000 Joules per square meter after heating the composition in situ for three minutes at 150° C.;
wherein said adhesive substantially retains said bond strength at temperatures between about minus 78° C. and plus 200° C.

2. An epoxy-based adhesive composition suitable for bonding molded polymeric automotive body structures to each other under assembly line conditions, comprising in parts by weight
100 parts of a cross-linkable epoxy novolac resin which is a condensation product of phenol and formaldehyde;
from about 10 to 20 parts of an adduct of about 2.5 mols of a diglycidyl ether of bisphenol-A and one mole of hydrogenated vegetable oil;
from about 2 to 8 parts thixotropic colloidal silica;
from about 0.07 to 0.10 moles of epoxy curing agent taken from the group consisting of 1-(2-hydroxyl propyl)imidazole and 1-(2-hydroxy propyl)-2-methylimidazole; and
an amount of natural silica powder sufficient to thicken a mixture of the several constituents so that said mixture can be extruded as a viscous bead onto a surface of a said molded panel;
said adhesive being curable to a bond strength of at least about 6,000 Joules per square meter after heating for three minutes at 150° C. and said bond strength being substantially undiminished at temperatures up to about 200° C.

3. An adhesive composition comprising in parts by weight 100 parts of a cross-linkable epoxy novolac resin which is a condensation product of phenol and formaldehyde having an epoxide equivalent weight in the range of from about 150 to 200 and a viscosity at 50° C. in the range of from about 1,000 to 2,000 centipoise;
from about 10 to 20 parts of an epoxy flexibilizer consisting essentially of an adduct of diglycidyl either of bisphenol-A and one or more constituents taken from the group consisting of epoxidized vegetable oils and epoxidized alkyl esters of oleic or tall oily fatty acids;
from about 100 to 150 parts natural silica having an average particle size in the range from about 2 to 8 parts thixotropic colloidal silica; and from about 0.07 to 0.10 moles of epoxy curing agent taken from the group consisting of 1-(2-hydroxy propyl)imidazole and 1-(2-hydroxy propyl)-2-methylimidazole; wherein said adhesive forms a bond between articles of compression molded sheet molding compound of at least about 6,000 Joules per square meter when the composition is cured at 150° C. for three minutes; said adhesive retaining a bond strength of at least about 6,000 Joules per square meter when tested at a temperature of 175° C. and about 4,000 Joules per square meter when tested at a temperature of 200° C. after 8 weeks continuous exposure to 5% sodium chloride salt spray solution at 37.8° C., to 100% relative humidity at 37.8° C. or to immersion in water at room temperature.

* * * * *